United States Patent

[11] 3,599,221

| [72] | Inventor | Ralph H. Baer<br>Manchester, N.H. |
|---|---|---|
| [21] | Appl No | 713,954 |
| [22] | Filed | Mar. 18, 1968 |
| [45] | Patented | Aug. 10, 1971 |
| [73] | Assignee | Sanders Associates, Inc.<br>Nashua, N.H. |

[54] RECORDING CRT LIGHT GUN AND METHOD
16 Claims, 10 Drawing Figs.

[52] U.S. Cl. .......... 346/1,
346/74 CR, 250/217 CR, 35/9 R, 346/37

[51] Int. Cl. ..... G01d 5/26,
H04n 5/76

[50] Field of Search .......... 346/37, 33,
110, 74 CR, 1; 340/173, 324.1; 178/6.6 A;
250/217 CR; 35/9, 48; 346/1

[56] References Cited
UNITED STATES PATENTS

| 2,454,651 | 11/1948 | Homrighous | 178/69.5 |
| 2,540,144 | 2/1951 | Stern | 250/217 X |
| 2,595,701 | 5/1952 | Potter | 179/100.3 |
| 3,136,839 | 6/1964 | Safir | 250/217 X |
| 3,233,244 | 2/1966 | Winterhalter | 346/74 X |
| 2,994,863 | 8/1961 | Trapnell | 346/33 X |
| 3,031,250 | 4/1962 | Laeufer et al. | 346/76 |
| 3,095,653 | 7/1963 | Corrigan | 35/9 |
| 3,181,154 | 4/1965 | Henne | 250/217 X |
| 3,189,889 | 6/1965 | Bridgett | 340/324 |
| 3,292,489 | 12/1966 | Johnson et al. | 353/25 |

*Primary Examiner*—Joseph W. Hartary
*Attorneys*—Louis Etlinger and Richard I. Seligman

ABSTRACT: Apparatus and method for recording a coded pattern on a CRT display comprises a detector for detecting the coded pattern, a decoder for recognizing the coded pattern, apparatus for generating a signal in response to a decode, and apparatus for recording the generated signal in a nondeceptive manner by recording the decode immediately subsequent the occurrence thereof. Alternatively, a signal is generated in response to a detected signal and recorded directly without decoding.

INVENTOR
RALPH H. BAER

PATENTED AUG 10 1971 3,599,221

INVENTOR
RALPH H. BAER

BY

*Richard J. Seligman*

ATTORNEY

INVENTOR
RALPH H. BAER
BY
*Richard J. Seligman*
ATTORNEY

RECORDING CRT LIGHT GUN AND METHOD

BACKGROUND OF THE INVENTION

This invention relates to an apparatus and method by means of which the detection of a coded pattern appearing on a CRT display can be recorded permanently permitting indefinite storage of the detection in a nondeceptive manner.

In many varied applications it is desirous to provide a nondeceptive record acknowledging the detection of a signal appearing on a CRT display. Exemplary of these applications are proof of TV program viewing in order to establish audience viewing ratings, participation in games and contests in conjunction with TV displays, etc. Broadly there is a requirement to close the loop between TV program originator and the viewer. Taking the audience rating problem as exemplary; in the past a viewer could send in a punched card indicating which programs he viewed during a particular period or could respond to a telephone or personal interview. These typical methods are unreliable in that the participant need not be honest or could make mistakes especially if the survey is conducted at a time not proximate the viewing period, or if the card if filled out at a later time.

Many games, contests etc. can be played by a TV viewer in conjunction with TV programming. For example, contests could be carried out in which one each evening a viewer must select and record one of a multiplicity of answers displayed, with the winner being the viewer having the most correct answers recorded. If the recording medium is merely a punched card or a card to be filled out, then the viewer need not respond (answer) at the time when the question is being posed and could answer at a later date after consultation with, for example, a reference source such as an encyclopedia. Furthermore, if the answer were to be written then it could be erased and another answer substituted therefor.

SUMMARY OF THE INVENTION

Accordingly, it is an object of this invention to provide an apparatus and method for recording a coded pattern appearing on a CRT display.

It is another object of this invention to provide an apparatus and method for recognizing and recording a coded pattern appearing on a CRT display.

It is yet another object of this invention to provide apparatus which permits a viewer to communicate with a cooperative TV station by recording coded information displayed on the TV screen which recording can be sent to the cooperative TV station.

It is a further object of this invention to provide for interrogating a standard TV receiver through an optical photo sensor in a manner allowing the identification of a coded message and for recording acknowledgement of the identification in a nondeceptive manner.

In accordance with one embodiment of the present invention apparatus is provided for detecting a coded signal appearing on the screen of a TV set and for recording an acknowledgement of such detection. For example, the coded signal can be a time-or-frequency coded message not interpretable by the unaided eye but one which causes a photocell circuit to react in such a manner as to acknowledge detection, for example by providing a DC level output. This DC level output can be used to drive an oscillator which puts out an AC signal which can be recorded, for example on a magnetic disc. By holding a recording head fixed and moving the magnetic disc during detection, the AC signal will be written onto the disc for the period of time in which there is relative movement between the recording head and the disc. Recording in this manner makes fraudulent entries very difficult.

BRIEF DESCRIPTION OF THE DRAWINGS

The aforementioned and other objects, features and advantages of the present invention will become more apparent from the following detailed description thereof when considered in conjunction with the drawings wherein.

DESCRIPTION OF PREFERRED EMBODIMENTS

Figure 1:
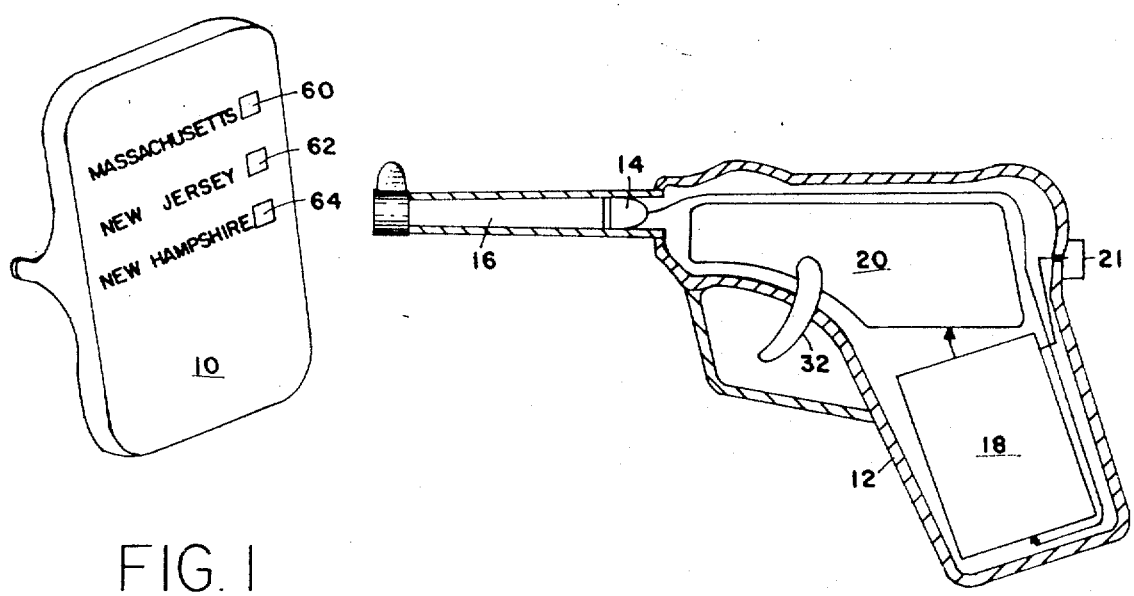
FIG. 1 is a sketch illustrating the principal components of one embodiment of the invention.

The principal components of one embodiment of a recording CRT light gun configured according to the invention are illustrated in FIG. 1 which is a pictorial view showing a cathode ray tube 10 on the screen of which a coded pattern which is to be recognized is displayed. The coded pattern can be generated by a cooperative TV station such as a commercial TV station, a closed circuit TV, or a CATV station. A light gun 12 contains the components for decoding (recognizing) the displayed coded pattern and for acknowledging the decode thereof. In operation, the light gun 12 is aligned with the CRT 10 such that light emanating from a coded pattern on the TV screen will illuminate a photosensitive detector 14 contained within the barrel 16 of light gun 12. The output from the photo sensitive detector 14 is applied to a decoder circuit 18 which decodes the coded pattern and generates a signal in response thereto. The output from the decoder circuit 18 is applied to a recording portion 20 of light gun 12. The entire detector decoder and recording elements are contained within the gun. The gun also contains a reset switch 21 to reset the decoder circuit. Preferably a battery also is contained within the gun such that no external connections are required. It is within the scope of this invention that the gun can be made in any configuration whatsoever.

Figure 2:
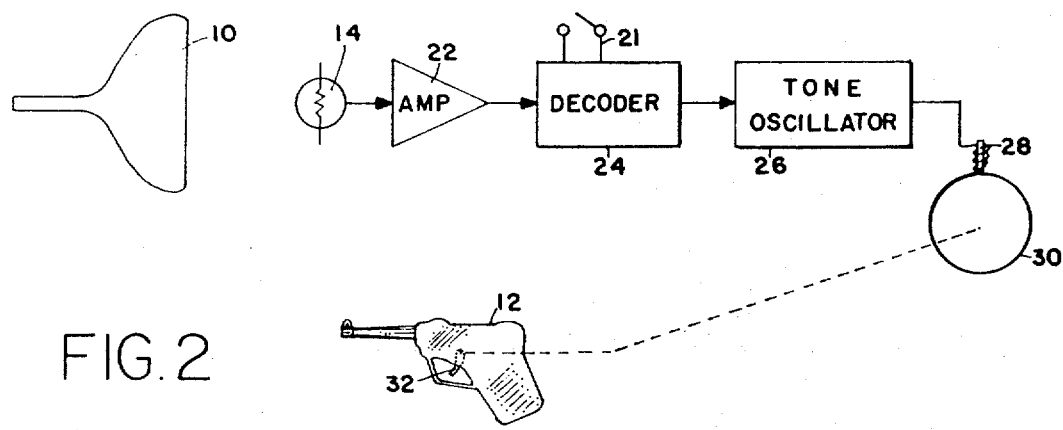
FIG. 2 is a sketch illustrating the manner in which the components of the embodiment of FIG. 1 are connected.

Referring now to FIG. 2 there is illustrated one manner in which the components of FIG. 1 are connected. The coded pattern upon CRT 10 is detected by photosensitive detector 14 and the signal output therefrom amplified by an amplifier 22. The amplified signal is applied to a decoder 24. When the decoder 24 signifies a decode it supplies a signal to a tone oscillator 26. Oscillator 26 is coupled to a recording head 28 which is arranged proximate a magnetic recording element 30 (herein shown as a magnetic disc). When the trigger 32 of light gun 12 is actuated, it causes (at the release thereof) magnetic recording element 30 to move relative to the fixed magnetic head 28 and record an output onto that portion of the magnetic recording element traversing the recording head. Typically, if a decode occurs, a short burst comprising several dozen cycles of the tone signal will be recorded.

The information appearing on the CRT can be coded in any number of ways. One way is to have the coded symbol flash a predetermined number of times, for example 61, while all other symbols on the screen flash, for example, 60 times. This difference of one flash would not be detected by the unaided eye but could be detected by the photosensitive detector and decoder circuits. The decoder circuits can be arranged to provide an output only in response to an odd number of flashes. The decoder can be essentially a flip-flop with buffering, pulse shaping and amplifying stages wherein a decode is recognized by the setting of one stage of the flip-flop to a "1," until reset.

The screen of CRT 10 in FIG. 1 contains 3 symbols 60, 62 and 64 adjacent three words which in one embodiment corresponds to 3 answers to a question posed. Only one of the symbols corresponds to the correct answer (in this case symbol 64). If the light gun is aligned with symbol 64 and the trigger thereof depressed and released, the acknowledgement that a correct answer was selected will be written onto the magnetic record.

One such decoder is found in my copending patent application for "Television gaming and Training Apparatus and Method" Ser. No. 697,798 filed Jan. 15, 1968. However, other decoders useful for the stated purpose will be readily apparent to those skilled in the art.

Figure 3:
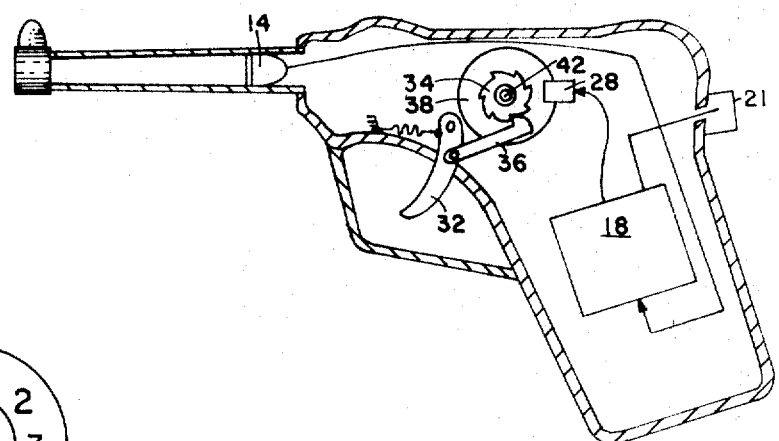
FIG. 3 is a sketch illustrating one embodiment of the invention.

Referring to FIG. 3 there is illustrated thereby an embodiment of the invention The output from photosensitive detector 14 is applied to the decoder circuit 18 which applies a tone burst output to magnetic recording head 28 when a decode occurs. A magnetic disc 38 is positioned proximate recording head 28 and has a ratchet wheel 34 coupled thereto. Cooperating with ratchet wheel 34 is a pawl 36 coupled to trigger 32 such that actuating and releasing the trigger 32 will cause the ratchet wheel 34 and thus the magnetic disc 38 to rotate one segment, equivalent to one tooth spacing of the ratchet wheel. The oscillator 26 contained within decoder circuit 18 energizes the magnetic head 28 continuously but recognizable recording of a tone burst occurs only when trigger release motion provides relative motion between recorder head 28 and disc 38. The decoder is reset upon actuation of switch 21.

Figure 4:
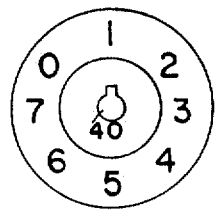
FIG. 4 is a sketch of a disc employed in the embodiment of FIG. 3.

FIG. 4 illustrates one embodiment for disc 38. The disc hub 40 is keyed to the shaft 42 (see FIG. 3) so that the initial insertion of the disc into gun 12 results in a required predetermined position of the disc with respect to recording head 28. In this manner, recordings are made in an identifiable location permitting a yes/no record of light gun responses arranged in an ordered sequence capable of later playback.

Figure 5:
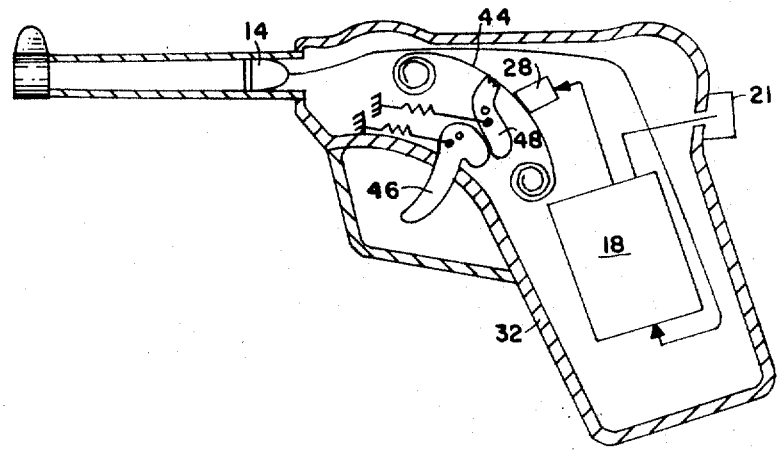
FIG. 5 is a sketch of another embodiment of the invention.

FIG. 5 illustrates another embodiment of the invention in which the tone bursts are recorded on a magnetic tape 44. The detection circuits and recording head are similar to those described with respect to the embodiment of FIG. 3. Actuation and release of a trigger 46 causes member 48 to move magnetic tape 44 past recording head 28 such that if a decode has occurred the tone burst will be recorded on the magnetic tape.

Figure 6:
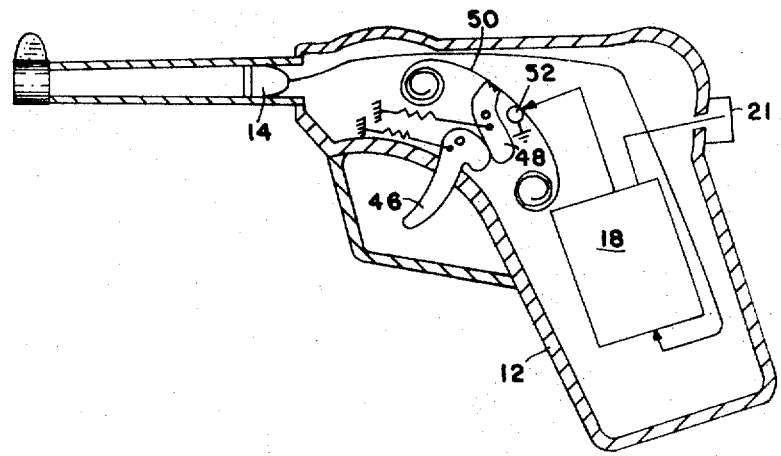
FIG. 6 is a sketch of a further embodiment of the invention

FIG. 6 illustrates a further embodiment of the invention. Depression and release of the trigger 46 moves a current sensitive paper 50 past a stylus 52 causing a series of intensity modulated dots to be burnt into the paper 50.

Figure 7:
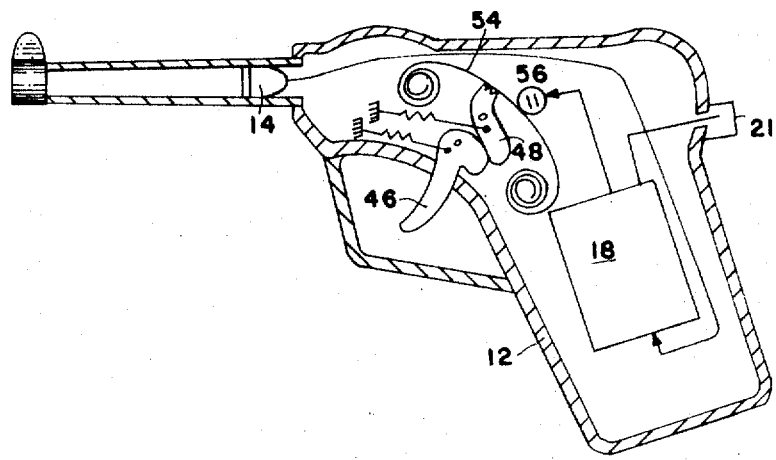
FIG. 7 is a sketch of yet another embodiment of the invention.

In FIG. 7 optically sensitive paper 54 is employed, with the acknowledged detection supplied by an optical source 56 which can be, for example, a neon lamp or a light-emitting diode.

In all these embodiments the recording takes place almost simultaneously with the detection thus precluding falsifying of the recorded information.

This invention can be employed to provide television program viewing ratings by a simple modification of the embodiments illustrated.

The studio generated programs can display a coded square similar to those shown in FIG. 1, however, the square rather than merely flashing an even or odd number of times would be given a digital identification code. An identification code can be produced by transmitting a succession of flashes in an intermittent stream with gaps denoting digital "zeros" and presence denoting digital "ones". For example, a one second burst at a 60 cycle frame rate results in say 60 (even) and 61 (odd) "square" burst transmissions when simple yes/no coding is employed. However, if the station would transmit shorter bursts and lack of bursts during the 60 second than a code is generated. For example, a 6 bit code such as 100101 can be originated by generating 10 flashes (in one sixth seconds), followed by one third of a second of no flashes, followed by 10 flashes within a 1/6 -second time period, followed by one sixth seconds of no flashes and in turn followed by ten flashes within a one sixth second duration. The code could represent any number of different items, for example the first two digits could identify the station, the second two digits the program, the fifth digit the first half of the program, the sixth digit the last half of the program, etc.

Figure 8:
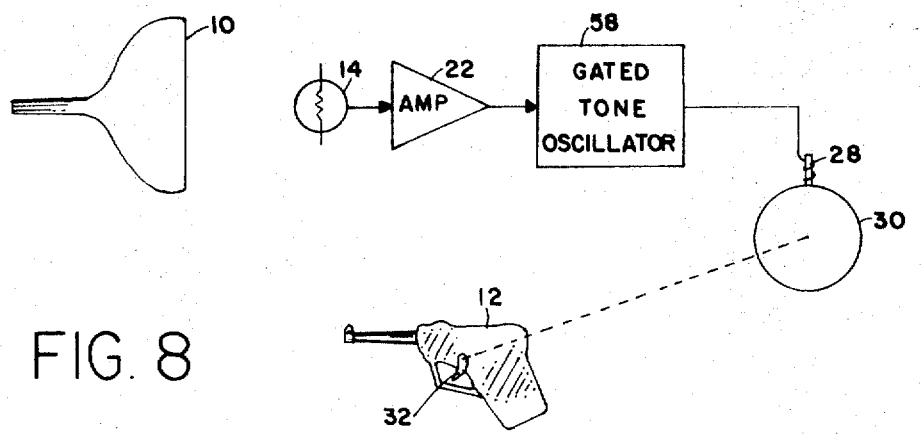
FIG. 8 is a sketch of a still further embodiment of the invention.

The code would be recognized in similar fashion to that of the yes/no code. However, the decoder would be bypassed and the flashes used to generate bursts from the tone oscillator. Referring to FIG. 8, there is illustrated a block diagram of a decoder circuit for this purpose. This decoder circuit would take the place of decoder circuit 18 in the embodiments of FIGS. 3,5,6 and 7. The decoder is bypassed and each burst detected by detector 14 causes a tone oscillator 58 to produce a short burst. The tone oscillator is gated on only when an output is received from detector 14. No reset switch is required for this embodiment.

Figure 9A:
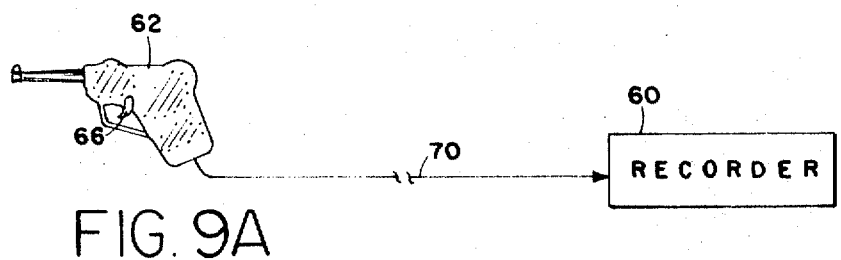
FIGS. 9A and B are a sketch of an alternate embodiment of the invention.
Figure 9B:

On an alternate arrangement, the recording member is housed with a separate unit as illustrated in FIGS. 9A and 9B. The recording member including the recording head and record medium (such as magnetic disc, strip, etc. is housed within a recorder 60. Recorder 60 also contains an eletromechanical transport mechanism such as a stepping switch to advance the disc or tape. The decoder circuit is contained with a gun 62 or a light pen 64 having as actuating members trigger 66 and switch 68, respectively. Gun 62 and light pen 64 are connected to recorder 60 via cables 70 and 72, respectively. The trigger 66 and switch 68 supplies current from, for example, a battery contained within the gun or light pen or within the recorder to the coil of the electromechanical transport mechanism.

While I have described above the principles of my invention in accordance with specific apparatus, it is to be clearly understood that this description is made only by way of example and not as a limitation of the scope of my invention as set forth in the accompanying claims.

I claim:

1. A method for recognition of a coded pattern appearing on a CRT display and immediate recording of a signal generated in response thereto comprising the steps of:

recognizing said coded pattern by decoding in response only to a single code;

generating a signal in response to said recognition of said single code; and recording said generated signal whereby a data record is obtained for subsequent analysis.

2. A method for recording of a digitally coded pattern comprising flashes and lack of flashes appearing on a CRT display, comprising the steps of:

detecting said code pattern by decoding only in response to a single code; generating signals responsive to said flashes of said single code; and recording said generated signals whereby a data record is obtained for subsequent analysis.

3. Apparatus for recognition of a coded pattern appearing on a CRT display and immediate recording a a signal generated in response thereto, comprising:

means for recognizing said coded pattern including a decoder responsive only to a single code;

means for generating a signal in response to a recognition of said single code; and means for recording said generated signal whereby a data record is obtained for subsequent analysis.

4. Apparatus as defined in claim 3 in which said means for recording said generated signal includes;

a member having magnetic oxide recording material thereon; and a recording head coupled to said means for generating a signal.

5. Apparatus as defined in claim 4 in which said means for generating a signal includes means for generating a tone burst.

6. Apparatus as defined in claim 4, further including means for providing relative motion between said recording head and said magnetic record means.

7. Apparatus as defined in claim 6, further including a "gun" having said recognizing means, said signal generating means and said recording means internal thereto, wherein said means for providing relative motion between said recording head and said magnetic record means includes a trigger coupled to said recording means, 8. Apparatus as defined in claim 7, further including a ratchet wheel connected to said magnetic record means and a pawl connected to said trigger, said pawl and ratchet wheel coupled such that said ratchet wheel will rotate a predetermined distance upon actuation of said trigger.

9. Apparatus as defined in claim 8 in which said magnetic record means includes a disc coupled to said "gun" in such a manner that initially said disc is situated in predetermined relationship with respect to said recording head.

10. Apparatus as defined in claim 9 in which said "gun" includes a shaft, said disc being keyed to said shaft.

11. Apparatus as defined in claim 7 in which said magnetic record means includes a roll of magnetic tape.

12. Apparatus as defined in claim 11, further including means for causing relative motion between said magnetic tape and said recording head responsive to actuation of said trigger.

13. Apparatus as defined in claim 3 in which said means for recording includes:
   a current sensitive element; and
   means for applying current to said current sensitive element responsive to said generated signal.

14. Apparatus as defined in claim 3, in which said means for recording includes:
   a photosensitive element; and
   means for applying light to said photosensitive element responsive to said generated signal.

15. Apparatus for recording of a digitally coded pattern comprising flashes and lack of flashes appearing on a CRT display, comprising:
   means for detecting said coded pattern including a decoded responsive only to a single code;
   means for generating signals responsive to said flashes of said single code; and
   means for recording said generated signals whereby a data record is obtained for subsequent analysis.

16. Apparatus as defined in claim 12 in which said means responsive includes an oscillator which generates a signal burst each time it is gated on by the detection of flashes of said single code.